United States Patent
Schünemann et al.

(10) Patent No.: US 6,241,376 B1
(45) Date of Patent: Jun. 5, 2001

(54) PROCESS FOR THE PREPARATION OF A MAGNETIC DISPERSION FOR MAGNETIC RECORDING MEDIA AND MAGNETIC RECORDING MEDIA PRODUCED THEREWITH

(75) Inventors: Axel Schünemann, Offenburg; Hans-Dieter Zettler, Grünstadt; Peter Nagel, Willstätt, all of (DE)

(73) Assignee: Emtec Magnetics GmbH, Ludwigshafen (DE)

( * ) Notice: Subject to any disclaimer, the term of this patent is extended or adjusted under 35 U.S.C. 154(b) by 0 days.

(21) Appl. No.: 09/186,477

(22) Filed: Nov. 5, 1998

(30) Foreign Application Priority Data

Nov. 7, 1997 (DE) .............................................. 197 49 315

(51) Int. Cl.[7] ...................................................... B01F 7/04
(52) U.S. Cl. .............................. 366/99; 366/289; 366/303
(58) Field of Search .......................... 366/96–99, 168.1, 366/171.1, 172.1, 172.2, 289, 303, 307, 315, 316, 348; 428/694 R

(56) References Cited

U.S. PATENT DOCUMENTS 4,826,324 * 5/1989 Kunz et al. ............................ 366/99
4,889,431 * 12/1989 Liechti ................................. 366/303
4,952,064   8/1990 Ono et al. .
5,178,460 * 1/1993 Kanda et al. ......................... 366/317

FOREIGN PATENT DOCUMENTS

3943340 * 7/1990 (DE) .

* cited by examiner

Primary Examiner—Charles E. Cooley
(74) Attorney, Agent, or Firm—Keil & Weinkauf

(57) ABSTRACT

A process for the preparation of high-quality magnetic dispersions having an Hc>120 kA/m, a residual induction Mr/Mm $\geq 0.9$ and an orientation ratio of about 2.7 achieves, with a self-purging single-shaft blade-type kneading apparatus, very advantageous magnetic values of the magnetic coatings and excellent tape characteristics if at least a) the radial shear gradient in the gap between blade circumference and housing wall is from about 150 to about 1600, in particular from about 500 to about 1400, 1/sec, and b) the circumferential velocity of the kneading blade is from about 20 to about 80, in particular from about 35 to about 60, cm/sec.

14 Claims, 2 Drawing Sheets

PROCESS FOR THE PREPARATION OF A MAGNETIC DISPERSION FOR MAGNETIC RECORDING MEDIA AND MAGNETIC RECORDING MEDIA PRODUCED THEREWITH

BRIEF DESCRIPTION OF THE INVENTION

The present invention relates to a process for the preparation of a magnetic dispersion for a magnetic coating with magnetic particles having a coercive force of more than 120 kA/m, a relative residual induction Mr/Mm of at least about 0.9 and an orientation ratio of at least 2.7 by means of a single-shaft blade-type kneading apparatus, the shaft rotating in a housing having a housing wall and at the same time oscillating in the axial direction for kneading a mixture of magnetic particles in a thermoplastic binder and a solvent, and the use of an apparatus suitable for the process and a magnetic recording medium produced by the process.

DESCRIPTION OF THE RELATED ART

DE-A-39 43 340 discloses a process for the preparation of magnetic coating compositions, a magnetic dispersion having a solids content of from 65 to 95% being kneaded in the kneading zones of a single continuous twin-shaft blade-type kneading apparatus and the gap widths in the dilution/kneading region being smaller than in the kneading zones. An abrupt change in the gap width thus occurs between the kneading zone and the dilution region. In this known process, the circumferential velocity of the blades is said to be within the range from 1 to 50, preferably from 2 to 20, cm/s. Relative residual inductions of from 0.84 to 0.89 are thus achieved in the magnetic tape, in combination with coercive forces of from 644 to 650 oerstedts, corresponding to from 51.2 to 51.7 kA/m, which is completely inadequate for recording media having a high storage density.

OBJECT OF THE INVENTION

In the process of DE-A-39 43 340, an optimum gap width in the kneading zone must be determined for each product by experiments, since otherwise a lower throughput occurs. In addition, operation will always be outside the optimum range owing to unavoidable wear.

It is an object of the present invention to provide an improved process which permits the economical preparation of relatively large amounts of magnetic dispersions which lead to magnetic coatings having better magnetic values and magnetic properties.

DETAILED DESCRIPTION OF THE INVENTION

We have found that this object is achieved if
a) the radial shear gradient in the gap between the tip of the kneading blade and the housing wall is from about 150 to about 1600, in particular from about 500 to about 1400, 1/sec and
b) the circumferential velocity of the kneading blade is from about 20 to about 80, in particular from about 35 to about 60, cm/sec.

The latter is in any case outside the preferred range of DE-A-3 943 340 and also partly well above the maximum value of 50 cm/sec stated there.

In practice, experiments with a twin-screw extruder according to DE-A-3 943 340 with a high shear gradient did not give better magnetic values in the finished magnetic tape.

It was not until, in the single-shaft blade-type kneading apparatus, the further feature, the radial shear gradient between blade circumference and housing wall, was set in the range from about 150 to about 1600, in particular from about 500 to about 1400, 1/sec, that particularly good magnetic values and electroacoustic values were obtained for the finished coating, in combination with substantially improved cost-efficiency of the process.

With the single-shaft blade-type kneading apparatus used for the novel process, it is possible to knead all products without modification of the kneading zone. There is no additional testing to discover optimum gaps and lengths of the kneading zone. The development times of a kneaded product are shortened.

Compared with the use of twin-shaft blade-type kneaders, the use of single-shaft blade-type kneaders for kneading magnetic pastes is surprisingly advantageous since, in the former, excessively high temperatures occur in the intermeshing zone between two pairs of blades, in particular when the circumferential velocities of the blades are increased. The high temperatures lead to concentration differences and separation in the kneaded paste and may lead to agglomeration under pressure which in turn is reflected in a nonuniform distribution of magnetic particles in the dispersion and hence in poor magnetic values in the finished magnetic recording medium.

It has proven advantageous if the shearing time below a kneading blade S1–S3 is from about $1/100$ to about $5/1000$ sec, which can be realized by a high volume flow rate and leads to high productivity. The kneading factor is advantageously from about 2 to about 80, in particular from about 10 to about 80. The kneading factor is dependent on the shear volume in the kneading zone, on the volume flow rate, on the residence time and on the speed (to be explained below) and is thus a characteristic for the throughput of the apparatus used in the process.

The shearing space, i.e. the volume over the length of the kneading zone of the apparatus, should, according to the invention, have a high degree of filling close to 100%, in particular from about 80 to about 100%.

This in turn ensures a high product throughput in combination with excellent magnetic values of the magnetic dispersion produced.

It has furthermore proven advantageous if the ratio of the radial to the axial shear gradient is less than 3.0, in particular from about 1.5 to 2.1.

It is also advantageous if the ratio of the axial to the radial shear surface area is from about 2 to 4. According to the invention, these ratios have an advantageous effect by improving the magnetic values.

The lengths of the individual kneading zones G, H in the apparatus also play a role with respect to the process. It has proven advantageous if the length of the kneading zone corresponds at least to eight times the diameter of the kneading blades.

It is also advantageous if the gap S between the tip of the kneading blade S1–S3 and the closest housing wall 5 has a width of from about 0.007 to about 0.03 times of the external kneading blade diameter.

The use of a single-shaft blade-type kneading apparatus V with a housing in which the blade shaft rotates and exerts shear stresses between blade circumference and housing wall and in the axial gaps and in which the blade shaft makes an oscillating movement O in the axial direction is regarded as very advantageous according to the invention, in which kneading apparatus V a) the radial shear gradient in the gap S between blade circumference and housing wall 5 is from about 150 to about 1600, in particular from about 500 to about 1400, 1/sec and b) the circumferential velocity of the kneading blade is from about 20 to about 80, in particular from about 35 to about 60, cm/sec.

The special requirements with respect to the preparation of magnetic dispersions from metal pigments having a relatively high coercive force and high relative residual induction under conditions which are economically substantially more advantageous than with the known twin-blade kneaders are thus met, with better tape characteristics of the magnetic tapes produced from such magnetic dispersions for the data and video signal recording sector with high and very high recording densities.

A metal pigment-containing magnetic recording medium produced with a magnetic coating according to the novel process features and comprising a magnetic coating having a coercive force of $\geq$ about 130 kA/m, a relative residual induction Mr/Mm of from about 0.9 to 0.92, an orientation ratio of about 2.7 and, after calendering at 70° C. and 2350 N, with a carrier signal/noise signal ratio C/N deviation of >−2 dB, a 3.5 MHz signal playback level deviation of from +1.0 to 1.7 dB as a characteristic of the success signal of dispersion of the kneading process and a 35.5 MHz signal playback level deviation of >−2 dB as a characteristic of the surface quality of the magnetic recording medium, the deviation measurements [dB] each being based on the metal pigment reference magnetic tape C1A-DB from Sony Corporation, has surprisingly good recording and playback properties.

The invention is described below with reference to an exemplary embodiment shown schematically in the drawing.

IN THE DRAWING

Figure 1:
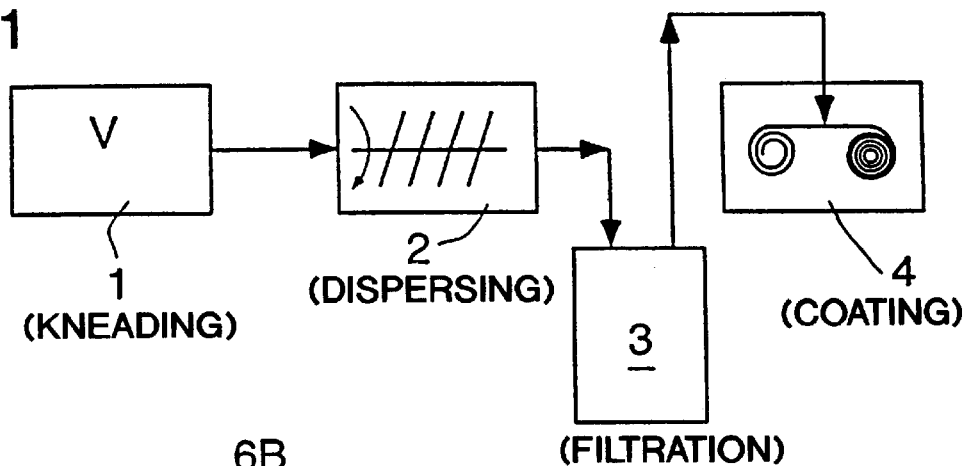
FIG. 1 shows a block diagram for the production of a magnetic recording medium

FIG. 1 schematically shows the process steps of kneading (block 1), dispersing (block 2), filtration (block 3) and coating (block 4).

Figure 2:
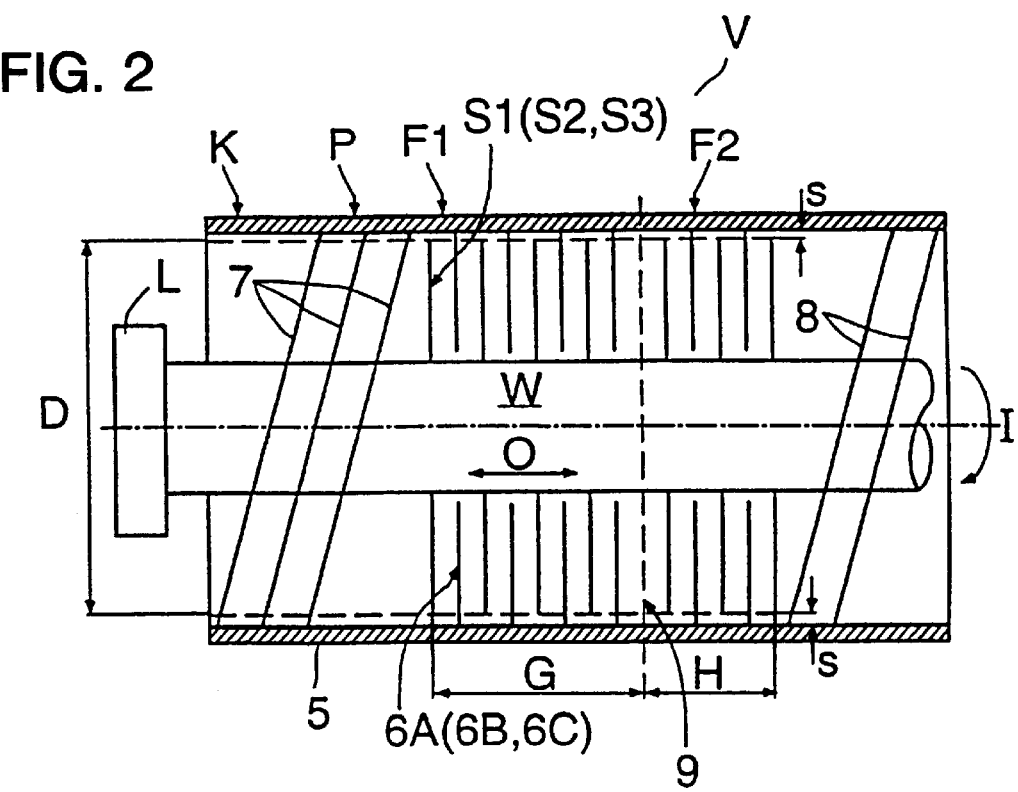
FIG. 2 shows a single-shaft blade-type kneader in schematic longitudinal view with various kneading zones

Block 1 represents a single-shaft blade-type kneading apparatus V which is described in more detail in FIG. 2. In FIG. 2, a metal pigment or a pigment mixture comprising various solids, such as carbon black, solid binder components, alumina and metal pigment, is introduced at arrow P. The solid or solids is or are transported by conveyor elements 7 in the direction of the kneading zone G and are wetted with the fluid F1, a binder solution, at arrow F1. The result is a kneadable paste, which is subjected to a load in the high-viscosity kneading zone G. One or more retarding elements 9 may be housed in this kneading zone G. Depending on the product feed position, however, it is also possible to dispense with the use of retarding elements 9.

The kneaded paste is diluted at the point indicated by the arrow F2. The fluid F2 either may be only solvent or may contain all additives required for the further processing in the stirred ball mills. The fluid F2 is incorporated in the low-viscosity kneading zone H and transported out of the machine by conveyor elements 8. Depending on the product feed position, however, it is also possible to dispense with the use of the conveyor elements 8, and the kneading zone H may also contain retarding elements 9.

The further processing is carried out by means of stirred ball mills (FIG. 1, block 2). After conversion into a coating composition, which can be carried out in the stirred ball mill itself, the magnetic dispersion is filtered (FIG. 1, block 3) and is applied as a coating on a tape coating apparatus (FIG. 1, block 4).

A production coating machine requires relatively large amounts of magnetic dispersion for the production of magnetic recording media, so that their production in a relatively large quantity and in a short time is an important object of this invention.

Test series for the production of optimum magnetic tapes for video, data and audio recording were therefore carried out and are to be described below.

The test results of various processes for the preparation of magnetic dispersions (Experiments A–E) are listed in Table 1.

After the kneading of the magnetic dispersion, the following steps were carried out for the production of a magnetic layer.

Dispersing in a stirred ball mill under identical conditions. Coating on an identical coating machine equipped with electromagnets for orientation. Production of a magnetic layer having layer thicknesses of 3.1 mm by means of calendering at 70° C. and under a nip pressure of 2350 N.

The same formulation was used in the kneading phase, consisting in each case of 100 parts of metal pigment, about 15 parts of resin having groups with dispersing activity, about 5 parts of lubricant and about 50 parts of solvent, the solids content in the kneading zone being about 74% and the metal pigment content being 65% by weight in order to obtain as far as possible comparable conditions and magnetic tapes of the same type.

The electroacoustic values of the finished magnetic tapes were measured digitally, i.e. in comparison with the metal pigment reference tape C1A-DB from Sony Corporation, and are thus available for comparison.

TABLE 1

| Experiment | A | B | C | D | E |
|---|---|---|---|---|---|
| Amount of pigment | | 6 kg | 6 kg/h | 12 kg/h | 8 kg/h |
| Volume flow rate | | 4 1 in 2.5 h | 4 1/h | 8 1/h | 5.25 1/h |
| Speed | | 20/40 rpm | 50 rpm | 200 rpm | 155 rpm |
| Circumferential velocity | | 8.5/17 cm/s | 10 cm/s | 48 cm/s | 37 cm/s |
| Radial shear gradient | | 167/33 5 1/s | 525 1/s | 1070 1/s | 830 1/s |
| Residence time | | 374 s | 210 s | 119 s | 234 s |
| Shear gradient × residence time | | 125 290 | 110 250 | 127 330 | 194 200 |
| Kneading factor | | 2.1 | 1.8 | 3.6 | 10.8 |
| Mill | 5 1 SBM | 5 1 SBM | 5 1 SBM | 5 1 SBM | 5 1 SBM |
| Gloss at 60° | 118 | 142 | 143 | 143 | 148 |
| Coating | E11 | E11 | E11 | E11 | E11 |
| Hc [kA/m] | 130.3 | 131.4 | 131.1 | 131.0 | 130.7 |
| Mm [mT] | 242 | 365 | 356 | 339 | 335 |
| Mr [mT] | 208 | 325 | 321 | 306 | 307 |
| Mr/Mm | 0.859 | 0.890 | 0.901 | 0.902 | 0.916 |
| Orientation ratio | 2.3 | 2.9 | 2.9 | 2.8 | 3.0 |
| Electro- | | | | | |

TABLE 1-continued

| Experiment | A | B | C | D | E |
|---|---|---|---|---|---|
| acoustic values-digital | | | | | |
| c7N | −2.4 | −2.6 | −3.1 | −1.4 | −1.3 |
| 3.5 MHz | −1 | −0.5 | +1.5 | +1.0 | +1.7 |
| 35.5 MHz | −3.2 | −3.7 | −3.8 | −1.4 | −1.3 |

3.5 MHz: Output level indicates the success of dispersion during kneading
35.5 MHz: Output level gives information about the surface quality Experiment A A standard dispersion was prepared without the aid of a kneading apparatus and was introduced directly into the stirred ball mill
Experiment B A trough-type or reciprocating kneader (batch kneader) was used for kneading, said kneader consisting of two relatively narrow, counter rotating blades in a trough-like container.
Experiment C A twin-shaft kneader, also referred to as a corotating twin-screw machine, was used for kneading.
Experiments D and E According to the invention, an oscillating single-shaft blade-type kneading apparatus, also referred to as a single-screw machine, was used for kneading.

In the case of the trough-type kneader (B), the pigment agglomerates are broken up only in the gap between the housing wall and the blade surface facing the housing wall. In the case of the twin-shaft and single-shaft blade-type kneaders (C or D, E), the agglomerates are broken up over the entire circumference of the kneading tool, i.e. in the axial gaps and the gaps between blade tip and housing wall.

In the case of the single-shaft blade-type kneading apparatus (D, E), the shear gap s is present between the housing wall 5 and the tips of the kneading blades S1–S3 mounted perpendicular to a rotating shaft W. The rotating tool is a triply interrupted screw shaft, of single shaft W, so that three blades S1–S3 are formed. These blades S1–S3 travel with an oscillating movement O past the stationary pins 6A–6C present on the housing wall 5.

Magnetic and electroacoustic values which can be achieved without kneading in the case of the metal pigment used are obtained in Experiment A, representing the lower limit of the technically feasible.

In Experiment B, great magnetic values but poor electroacoustic values were obtained for the tape in spite of relatively low shaft speeds of 20/40 rpm and a small radial shear gradient of 167/335 1/s.

The results of Experiment B are comparable with those of Experiment C, but in the latter the shaft speed of 50 rpm is higher, the shear gradient of 525 1/s is considerably greater, the magnetic values are roughly comparable and the electroacoustic values are in some cases better in Experiment C. The amount of pigment used in each of Experiments A–C was 6 kg.

Experiments D and E: The results of the single-screw kneader K, the embodiment shown as an example in FIG. 2, are excellent with respect to the following values:

1) The amount of pigment could be doubled in the case of D and increased by about a third in the case of E.
2) The circumferential velocity of 200 rpm (D) and 155 rpm (E) was four times and three times, respectively, that of Experiment C.
3) The shear gradient of 1070 1/s (D) was about 100% higher than in the case of Experiment C. In the case of E, the increase was 58% compared with C.
4) The magnetic values were substantially better than in Experiment C.
5) The electroacoustic values (digital electroacoustic data) were substantially better than in the case of the tape from Experiment C.

Figure 3:
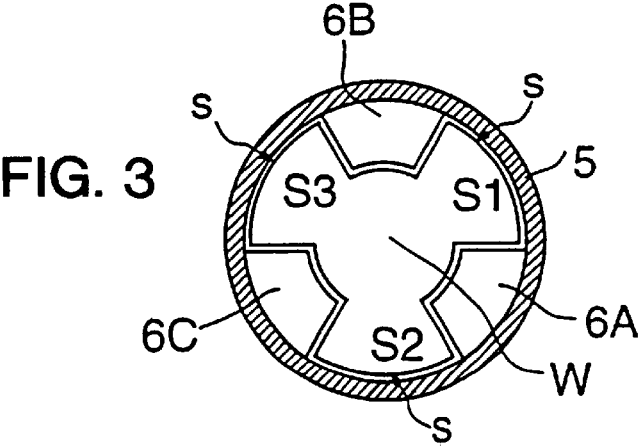
FIG. 3 shows a plan view, on a smaller scale, of the shaft shape in the housing of the blade kneader according to FIG. 2

The single-shaft apparatus V is described below, with reference to FIGS. 2 and 3, as an advantageous embodiment for the use according to the invention as a production apparatus for a magnetic dispersion of high quality. The single-shaft apparatus is self-purging in the main kneading zone G and in the dilution zone H but not in the other regions. Nevertheless, single-shaft apparatus of this type are referred to as self-purging.

The shaft W is formed with feed elements 7 in whose initial region the solid feed and pigment feed P also takes place. Kneading elements S1–S3, which are also visible as blades S1–S3 in FIG. 3, follow in the axial direction of the shaft W. The kneading pins or teeth 6A–6C mounted on the housing are also shown in plan view in FIG. 3. The shaft W is guided at one end in a bearing L. The shaft W is rotated by means of a special gear construction (not shown) (arrow I) and at the same time subjected to a back-and-forth oscillation (double-headed arrow O).

In the initial region in which solids conveying takes place, the high-viscosity kneading zone G, in which the pigment/binder mixture is subjected to high shear forces, follows behind the fluid feed orifice F1, the fluid being a binder solution. The high-viscosity kneading zone G is followed by the low-viscosity mixing zone H which contains the fluid feed orifice F2 where the other components of the tape layer formulation and solvent are introduced.

The dashed line 9 represents a retarding element which influences the degree of filling of the single kneading zone G.

The external diameter of the blades S1–S3 is denoted by D. The kneading pins 6A–6C are arranged on the housing K in such a way that, on movement of the shaft W, its blades S travel past the kneading pins 6A–6C with an oscillating movement.

The kneading function of the kneading machine for magnetic dispersions consists in deagglomeration and wetting of the pigments as well as in the important property of distributing the acicular magnetic pigments homogeneously in the binder matrix, it also being necessary to ensure gentle treatment of the binder itself. In order to perform these functions, the resulting pressures must not be too high, i.e. they must occur uniformly and may not be extremely high, such as those present, for example, in the intermeshing zone of the twin-screw machines, since excessively high pressures result in concentration differences. The shear gradient in twin-screw machines (Experiment C) is greater by about a factor of 2–3 than in the case of the single-shaft machine, the shaft speed being the same. An increase in the shaft speed in the case of twin-screw machines resulted in high temperatures of the kneaded paste and concentration differences which led to damage to the polymer material and to the pigment. In practice, concentration differences result in a lower binder content of the kneaded paste, promoting the formation of agglomerates of the pigment. Moreover, poorer magnetic values (relative residual inductions Mr/Mm= 0.901) were obtained with the same shear gap. An increase in the degree of filling of the kneading zone (degree of filling = actually used kneading volume relative to maximum existing kneading volume) above 60% led to a substantial deterioration in the tape data in the case of the twin-screw machine, which means an increase in the throughput by increasing the degree of filling above 60% is not possible.

According to the invention, the use of the single-shaft machine V has in comparison the advantage that the distribution and deagglomeration effect is more uniform because the shear gradient is surprisingly suitable for the preparation of magnetic dispersions in the range from about 150 to about 1600, in particular from about 500 to about 1400, 1/sec if this single-shaft machine V also has a circumferential velocity of the kneading blades of from about 20 to about 80, in particular from about 35 to about 60, cm/sec. The external diameter D of the kneading blades S1–S3 and a resulting gap width were used in the calculation. It was also found that the radial shear gradient is about twice the axial shear gradient (which was based on the average kneading blade diameter).

The values in Experiments D and E are compared below:

Experiment D:

The shear gradient is 1070 1/sec—compared with 525 1/sec (Experiment C) Circumferential velocity 48 cm/sec—compared with 10.5 cm/sec.

Experiment E:

The shear gradient is 830 1/sec Circumferential velocity 37 cm/sec Consequently, good magnetic values Mr/Mm and excellent tape properties can be achieved by a high shear gradient and a sufficient residence time.

As mentioned above, the kneading factor also plays a role with respect to the subsequent tape properties.

The housing surface and the blade surface give, as a result of the shear gap, a volume in which the paste is sheared per shaft revolution.

Multiplied by the shaft revolutions during the residence time of the paste in the kneading zone, this gives the available shear volume. Thus $$\text{Kneading Factor} = \frac{\text{Shear Volume} \times \text{speed} \times \text{residence time}}{\text{Volume flow rate}}$$

The kneading factors of 3.6 (D) and 10.8 (E) are well above the kneading factors in (C) 1.8 and (B) 2.1, so that the magnetic and tape values (digital electroacoustic values), too, are considerably better in the case of D and E than in the case of A–C, cf. Table 1.

A comparison of the individual values of Experiments B and C with Experiments D and E according to the invention gives the following differences: The magnetic values:

Coercive forces (Hc) are all about 131, the relative residual inductions are all from 0.90 to 0.91 and the orientation ratios differ slightly with 2.90 for C and B, 2.80 for D and 3.0 for E.

The tape values:

The tapes were coated under identical conditions and surface-treated by means of the same calender with steel/steel rolls at 70° C. and 2350 N nip pressure, as described above. result of the shear gap, a volume in which the paste is sheared per shaft revolution.

Multiplied by the shaft revolutions during the residence time of the paste in the kneading zone, this gives the available shear volume. Thus Shear volume×speed×residence time Kneading factor=Volume flow rate The kneading factors of 3.6 (D) and 10.8 (E) are well above the kneading factors in (C) 1.8 and (B) 2.1, so that the magnetic and tape values (digital electroacoustic values), too, are considerably better in the case of D and E than in the case of A–C, cf. Table 1.

A comparison of the individual values of Experiments B and C with Experiments D and E according to the invention gives the following differences: The magnetic values:

Coercive forces (Hc) are all about 131, the relative residual inductions are all from 0.90 to 0.91 and the orientation ratios differ slightly with 2.90 for C and B, 2.80 for D and 3.0 for E.

The tape values:

The tapes were coated under identical conditions and surface-treated by means of the same calender with steel/steel rolls at 70° C. and 2350 N nip pressure, as described above.

| *Electroacoustic data (dB) | Experiment B | Experiment C | Experiment D | Experiment E |
|---|---|---|---|---|
| Carrier signal/noise signal | −2.6 | −3.1 | −1.4 | −1.3 |
| 3.5 MHz output level | −0.5 | +1.5 | +1.0 | +1.7 |
| 35.5 MHz output level | −3.7 | −3.8 | −1.4 | −1.3 |

*Electroacoustic data = storage data

The measured data were based on the metal pigment reference tape C1A-DB from Sony Corporation.

The comparison shows that, except for the 3.5 MHz output level, all other measured values of the magnetic tape produced according to the invention (Experiments D and E) were outstandingly better.

As also shown by Table 1 for Experiments A–E, twice as large a volume flow was processed in novel Experiment D and a 33% larger volume flow in Experiment E than in the other Experiments A–C, which of course also resulted in the correspondingly larger amount of magnetic dispersion produced, with the result that it was possible to produce correspondingly more magnetic tapes.

Figure 4:
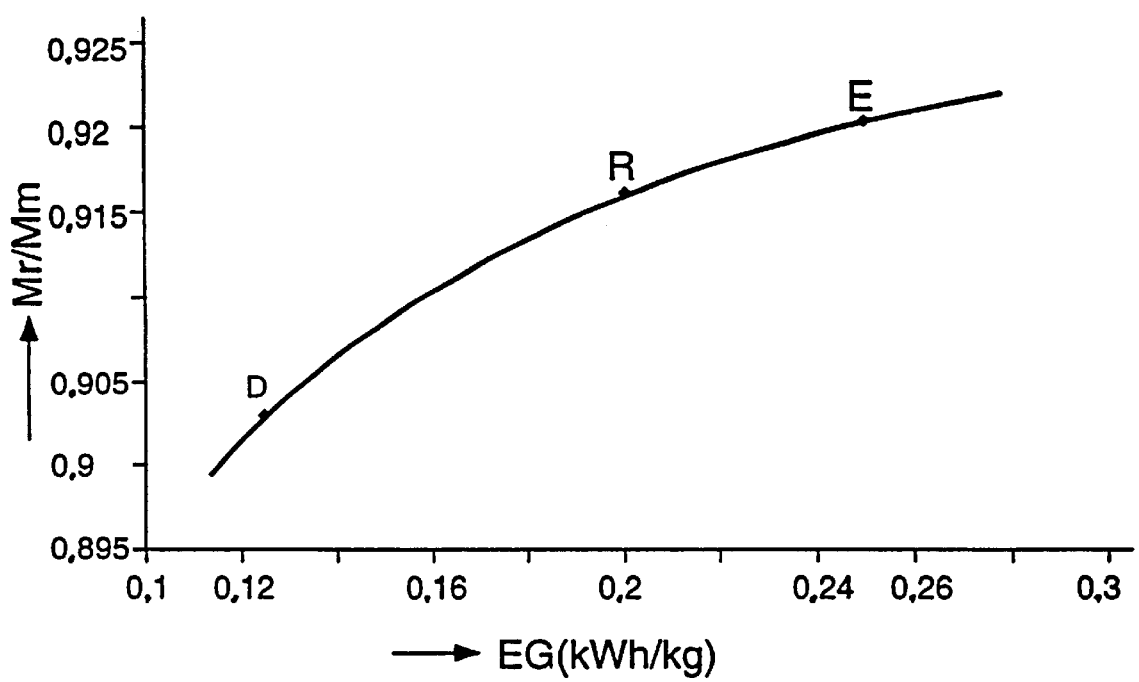
FIG. 4 shows a plot of the relative residual induction as a function of energy introduction during kneading.

FIG. 4 shows the energy introduction EG during kneading of the paste as a function of the relative residual induction Mr/Mm of the three magnetic dispersions prepared according to the invention, from the values of Experiments D and E and of a further Experiment R not described in detail.

A specific energy introduction EG of >0.12 to about 0.25 kWh per kg of pigment is evident from FIG. 4.

In comparison, the specific energy introduction EG of a twin-screw kneading machine is about 0.1–0.11 kWh per kg of pigment.

Since the specific energy introduction is a characteristic of the dispersing of the pigment agglomerates, the greater the specific energy introduction during kneading of a pigment paste the more successful the separation of the pigment needles or the individual pigments and the closer the relative residual induction Mr/Mm to 1, the ideal state in which there are only magnetic pigments in isolated form.

The value of the specific energy introduction at from >0.12 to about 0.25 is therefore well above the value 0.1–0.11 kWh/kg of the known twin-screw machines, so that the relative residual inductions EG in the novel process are greater and, in the case of Experiment E, even considerably greater.

According to the invention, the specific energy introduction EG may advantageously be from about 0.1 to 0.3 kWh/kg.

The specific energy introduction EG can be determined by means of a torque measuring shaft or by measuring the electric power consumption of the kneading machine.

The specific energy introduction EG during kneading is defined as the instantaneous power N minus the idle power N0 in kW, divided by m, the mass flow rate of pigment in kg/h. The unit is kWh/kg.

The present invention relates to a process for the preparation of high-quality magnetic dispersions having an Hc >120 kA/m, a residual induction Mr/Mm ≧0.9 and an orientation ratio of about 2.7, which achieves, with a single-shaft blade-type kneading apparatus V, very advantageous magnetic values of the magnetic coatings and excellent tape characteristics if at least the following features are fulfilled:

a) the radial shear gradient in the gaps between blade circumference and housing wall 5 is from about 150 to about 1600, in particular from about 500 to about 1400, 1/sec b) the circumferential velocity of the kneading blade S1–S3 is from about 20 to about 80, in particular from about 35 to about 60, cm/sec, and to a magnetic recording medium produced therewith.

The magnetic dispersion prepared can be used in particular for data and video recording media having high recording and storage rates.

We claim:

1. A process for the preparations of a magnetic dispersion for magnetic coating with magnetic particles having a coercive force of more than 120 kA/m, a relative residual induction of Mr/Mn of at least about 0.9 and an orientation ratio of at least 2.7 by means of a single-shaft blade-type kneading apparatus (V) having at least one kneading blade (S1–S3), the shaft (W) rotating in a housing (K) having a housing wall 5 and at the same time oscillating in the axial direction (arrow O) for kneading a mixture of magnetic particles a in a thermoplastic binder and a solvent, comprising the following features a) the radial shear gradient in the gap (s) between the tip of the kneading blade (S1–S3) and housing wall 5 is about 150 to 1600, 1/sec b) the circumferential velocity of the kneading blade (S1–S3) is from about 20 to about 80 cm/sec.

2. A process as claimed in claim 1, wherein the shearing time below the kneading blade (S1–S3) is from about 1/100 to about 5/1000 sec.

3. A process as claimed in claim 1, wherein a kneading factor is from about 2 to about 80, is applied in the kneading apparatus (V).

4. A process as in claim 3 wherein the kneading factor is from about 10 to about 80.

5. A process as claimed in claim 1, wherein a shearing space is located in the housing (K) of the blade-type kneading apparatus (V) which space has a high degree of filling of up to 100%.

6. A process as claimed in claim 5 wherein the ratio of the axial shear surface area to the radial shear surface area is from about 2 to about 4.

7. A process as claimed in claim 5, wherein the length of a kneading zone (G) in the kneading apparatus (V) corresponds at least to eight times the diameter (D) of the kneading blade (S1–S3) In the kneading apparatus (V).

8. A process as in claim 5 wherein the degree of filling is from about 80 to about 100%.

9. A process as claimed in claim 1, wherein in the kneading apparatus (V) a ratio of the radial shear gradient to the axial shear gradient is less than 3.0.

10. A process as in claim 9 wherein the ratio is from about 1.5 to 2.1.

11. A process as claimed in claim 1, wherein the gap (s) between the tip of the kneading blade (S1–S3) and the closest housing wall (5) has a width of from about 0.007 to about 0.03 times the kneading blade diameter (D).

12. A process as claimed in claim 1, wherein the specific energy introduction (EG) Der kg of magnetic particles is from about 0.1 to 0.3 kWh.

13. A process as in claim 1, wherein the radial shear gradient in the gap (s) between the tip of the kneading blade (S1–S3) and housing wall (5) is from about 500 to about 1400 1/sec.

14. A process as in claim 1, wherein the circumferential velocity of the kneading blade (S1–S3) is from about 35 to 60 cm/sec.

* * * * *

UNITED STATES PATENT AND TRADEMARK OFFICE
CERTIFICATE OF CORRECTION

PATENT NO. : 6,241,376 B1
DATED : June 5, 2001
INVENTOR(S) : Schuenemann et al.

Page 1 of 1

It is certified that error appears in the above-identified patent and that said Letters Patent is hereby corrected as shown below:

Column 9, claim 1,
Line 29, "and housing" should be -- and the housing --.

Column 10, claim 7,
Line 14, "In" should be -- in --.

Column 10, claim 12,
Line 28, "Der" should be -- per --.

Signed and Sealed this

Thirteenth Day of November, 2001

Attest:

*Nicholas P. Godici*

NICHOLAS P. GODICI
*Attesting Officer*    *Acting Director of the United States Patent and Trademark Office*